(12) United States Patent
Can et al.

(10) Patent No.: US 8,300,938 B2
(45) Date of Patent: Oct. 30, 2012

(54) METHODS FOR SEGMENTING OBJECTS IN IMAGES

(75) Inventors: Ali Can, Troy, NY (US); Alberto Santamaria-Pang, Schnectady, NY (US)

(73) Assignee: General Electric Company, Niskayuna, NY (US)

( * ) Notice: Subject to any disclaimer, the term of this patent is extended or adjusted under 35 U.S.C. 154(b) by 348 days.

(21) Appl. No.: 12/757,668

(22) Filed: Apr. 9, 2010

(65) Prior Publication Data

US 2011/0249883 A1    Oct. 13, 2011

(51) Int. Cl.
    *G06K 9/34* (2006.01)
(52) U.S. Cl. ......... 382/173; 382/128; 382/133; 382/164
(58) Field of Classification Search .................. 382/173, 382/164, 165, 167, 118, 128, 130, 133, 254; 348/606; 455/411, 41.1, 517, 63.1; 370/316, 370/328
See application file for complete search history.

(56) References Cited

U.S. PATENT DOCUMENTS

| | | | |
|---|---|---|---|
| 7,035,461 B2* | 4/2006 | Luo et al. ...................... | 382/167 |
| 7,263,220 B2* | 8/2007 | Crandall et al. .............. | 382/165 |
| 7,636,485 B2* | 12/2009 | Simon et al. .................. | 382/254 |
| 2007/0026525 A1 | 2/2007 | Marcelpoil et al. | |

OTHER PUBLICATIONS

C. Wahlby et al., "Sequential Immunofluorescence Staining and Image Analysis for Detection of large Numbers of antigens in Individual Cell Nuclei," Wiley-Liss Inc., 2002, Section 47, pp. 32-41.
A. Can et al., "Techniques for Cellular and Tissue-Based Image Quantitation of Protein Biomarkers," Published in Microscopic Image Analysis for Lifescience Applications, Chapter 8, Aug. 2008, pp. 1-8.
Y, Freund et al., "A Decision-Theoretic generalization of On-Line Learning and an Application to Boosting," Journal of computer and System Sciences, vol. 55, 1997, Article No. SS971504, pp. 119-139.
G. Lin et al., A Hybrid 3D Watershed algorithm Incorporating Gradient Cues and Object Models for Automatic Segmentation of Nuclei in Confocal Image Stacks, Wiley-Liss Inc., 2003, vol. 56A, pp. 23-36.
J. Lindblad et al., "Image Analysis for Automatic Segmentation of Cytoplasms and classification of Rac1 Activation," Wiley-Liss Inc., vol. 57A, 2004, pp. 23-33.
T. Mouroutis et al., "Robust cell nuclei segmentation using statistical modelling," Bioimaging, vol. 6, PII: S0966-9051, 1998, pp. 79-91.
D. Padfield et al., "Spatio-Temporal Cell Segmentation and Tracking for Automated Screening," IEEE International Symposium on Biomedical Imaging, ISBN: 978-1-4244-2002-5, May 14-17, 2008, pp. 376-379.
P.S. Umesh Adiga et al., "An efficient method based on watershed and rule-based merging for segmentation of 3-D histo-pathological images," Pergamon, The Journal of the Pattern Recognition Society, vol. 34, 2001, pp. 1449-1458.

* cited by examiner

*Primary Examiner* — Anh Hong Do
(74) *Attorney, Agent, or Firm* — Jenifer E. Haeckl (57) ABSTRACT

A method for segmenting a digital image into a plurality of target objects, comprising, generating a plurality of probability maps of the image, wherein each probability map is derived from a different segmentation classifier; generating a combined probability map based on the plurality of probability maps; mapping a plurality of image points based on one or more local object maxima; applying one or more object constraints based at least in part on the mapped points to identify local object information; applying one or more regional thresholds to the combined probability map, given the local object information and a background mask, to segment the image into regions; creating a segmented image at least in part by merging the segmented regions with corresponding local object maxima; and at least temporarily storing or displaying the segmented image on a digital device.

11 Claims, 6 Drawing Sheets

METHODS FOR SEGMENTING OBJECTS IN IMAGES

BACKGROUND

The invention relates generally to digital images and more specifically to segmentation of objects in the digital images to extract content from the images.

Segmenting images of complex, three-dimensional materials into discrete and identifiable objects or targets for analysis is a challenging problem because of the high degree of variability associated with the materials, and inconsistencies between, and anomalies introduced by, the imaging systems themselves.

For example, segmenting or delineating images of biological tissue samples into its constituent parts, such as cells and cellular nuclei, poses a particular significant problem due to additionally introduced variability associated with in staining of the biological material and fluorescence-based microscopy imaging. The three dimensional nature of thin tissue sections introduces out of focus artifacts in magnifications greater than 10×. As an example, the quantification of proteins expression at sub-cellular level is an imperative step in the image analysis process for the quantification of protein expressions of tissue samples. This type of quantitative analysis enables biologists and pathologists to analyze, with a high level of detail, a molecular map of thousands of cells within a given cancer tumor. It also provides new insights into the complex pathways of protein expressions. With the advent of automated image acquisition platforms, such as General Electric's InCell 2000 analyzer, there is an increased need for high content image analysis in the form of automated methods for extracting and analyzing such content from tissue samples.

With regard specifically to biological sample analysis, there are numerous problems associated with detecting and delineating cell nuclei. Cells are three-dimensional objects, and the images of such cells capture a two-dimensional projection that corresponds to the given slice of the tissue. Partial cell volumes that are outside the focal plane are commonly observed. Nuclei shape and size also vary widely across different tissue types and even within the same tissue type. For example, the shape of epithelial cell nuclei in lung tissue is different than the shape of stromal cell nuclei in lung tissue. The grade of a given cancer also may significantly affect the shape and the size of the nuclei. For example, the size of the cell nuclei in breast cancer is a diagnostic indicator.

In addition to cellular variations, staining quality and tissue processing also vary from sample to sample; although non-specific binding and tissue autofluorescence can be reduced, they typically cannot be eliminated; the image acquisition system further introduces noise, particularly, for example, if the image acquisition camera is not actively cooled; and most microscopes are manufactured with tolerances up to 20% non-uniformity of illumination.

BRIEF DESCRIPTION

The methods of the invention provide a highly robust boosted approach wherein the technical effect is to segment images into discreet or targeted objects. The methods build a strong or reliably consistent segmentation result from a plurality of generally weaker or less consistent segmentation results. Each weaker segmentation method generates a probability map that captures different, yet complementary, information. The strong segmentation, integrates the probability results from the weaker segmentation methods, based on various parameters or predefined rules such as, for example, a weighted average or sum. A watershed method is applied, together with one or more morphological constraints to the integrated, but stronger, combined segmentation, to identify and segment the nuclear regions of the image. The methods are first described here using a more general workflow, where weak segmentation algorithms are combined to generate a strong segmentation algorithm, that may be applied to a variety of images for a variety of purposes. The general method is then applied to a specific, but non-limiting, example in which an image of a biological sample is segmented into cells. Although the specific example uses a subset of segmentation algorithms comprising, curvature based segmentation, image gradients, Gabor filters, and intensity, that are particularly useful with images of biological materials, the methods of the invention may be applied to other types of subject matter and so may comprise alternative subsets of algorithms.

An embodiment of the method of the invention, for segmenting a digital image into a plurality of target objects, comprises: generating a plurality of probability maps of the image, wherein each probability map is derived from a different segmentation classifier; generating a combined probability map based on the plurality of probability maps; mapping a plurality of image points based on one or more local object maxima; applying one or more object constraints based at least in part on the mapped points to identify local object information; applying one or more regional thresholds to the combined probability map, given the local object information and a background mask, to segment the image into regions; creating a segmented image at least in part by merging the segmented regions with corresponding local object maxima; and at least temporarily storing or displaying the segmented image on a digital device.

DRAWINGS

These and other features, aspects, and advantages of the present invention will become better understood when the following detailed description is read with reference to the accompanying drawings in which like characters represent like parts throughout the drawings, wherein:

FIGS. 3A-3D are examples of probability maps based four weak classifiers.

DETAILED DESCRIPTION

The methods and systems provide significant improvements to previous methods for segmenting digital images. The methods in part construct a strong classifier from a number (N) of weak classifiers. The term weak classifier is used in this description merely to denote a classifier that, when used alone, does not provide a reproducibly strong, consistent segmented image, as does the stronger classifier of the invention which comprises a combination of a plurality of individual weaker classifiers. Each of the weaker classifiers, used in one or more of the embodiments described, provides unique and different information in the form of a probability estimate whether a given pixel belongs to a target object, such as a nucleus of a cell. A combination classifier of the invention combines the results of the weaker individual classifier results. The stronger, classifier integrates both global and local information derived from the weaker segmentations to generate a more consistently accurate segmented image. In one or more of the embodiments, a watershed algorithm, together with one or more local constraints, is applied to the stronger data to identify and map individual target objects, such as cell nuclei.

To more clearly and concisely describe and point out the subject matter of the claimed invention, the following definitions are provided for specific terms, which are used in the following description and the appended claims. Throughout the specification, exemplification of specific terms should be considered as non-limiting examples.

As used herein, the term "target object" refers to any item of interest, to which a plurality of different classifiers or definitions can be applied, for the purpose of extracting content from a segmented digital image.

As used herein, the term "classifier" refers to one or more parameters of a digital image that can be expressed as an algorithm.

As used herein, the term "probability map" refers to a map, of all or a portion of the pixels or image points in a digital image, which indicates the likelihood that a given pixel falls within a class based on a classifier previously applied to the digital image. The map may be virtual, actual, stored or ephemeral, depending on a given application or system.

As used herein, the term "local object maxima" refers to the highest value or degree as defined by a given classifier, among the pixels or image points associated with a discrete target object in a digital image.

As used herein, the term "object constraint" refers to one or more algorithmic statements or rules that may be applied to an object that may include, but are not limited to, those that define or limit the object's context or situation; a property, attribute or characteristic of the object; and conditions or expression qualifiers.

As used herein, the term "local object information" refers to any information associated with a given object including, but not necessarily limited to, facts, data, conclusions, estimates, statistics, transformations, and conditions associated with an object.

As used herein, the term "regional threshold" refers to a rule or statement that is applied to an image to segment the image into regions such as, for example, watershed or watershed-based algorithms.

As used herein, the term "digital device" refers to any device that can at least temporarily store, display, generate, manipulate, modify or print a digital image.

The methods and system may be used to segment of a broad class of objects in digital images. The methods and systems may be used, for example, to segment objects that have elliptical shapes, such as those found in images associated with industrial inspection and medical and biological imaging.

One or more embodiments of the methods construct a probability map using a novel boosting approach, to which a watershed algorithm, with at least one object constraint, is applied. A strong classifier is constructed, together with one or more morphological constraints, based on a plurality of weaker classifiers that provide complementary information such as, but not limited to, shape, intensity and texture information.

In one example, detection of cell nuclei comprises modeling various nuclei attributes such as shape, intensity and texture in the cell. For example, although the overall shape of many types of cell nuclei is circular or elliptical, there is considerable variation in size and shape depending on tissue type and morphology. With regard to texture, when imaging cells, nuclei texture may vary, in part, due to uneven binding and distribution of the fluorescent dyes applied to the cellular material or tissue sample. Image intensity also varies between images and across a single and may be caused by a number of factors, some of which are associated with microscopy system itself.

In one example, detection of two-dimensional cell nuclei obtained from three-dimensional tissue sections comprises modeling various nuclei attributes such as shape, intensity and texture in the cell. For example, although the overall shape of many types of cell nuclei is circular or elliptical, there is considerable variation in size and shape depending on tissue type and morphology. With regard to texture, when imaging cells, nuclei texture may vary, in part, due to uneven binding and distribution of the fluorescent dyes applied to the cellular material or tissue sample. Image intensity also varies between images and across a single and may be caused by a number of factors, some of which are associated with microscopy system itself.

Figure 1:
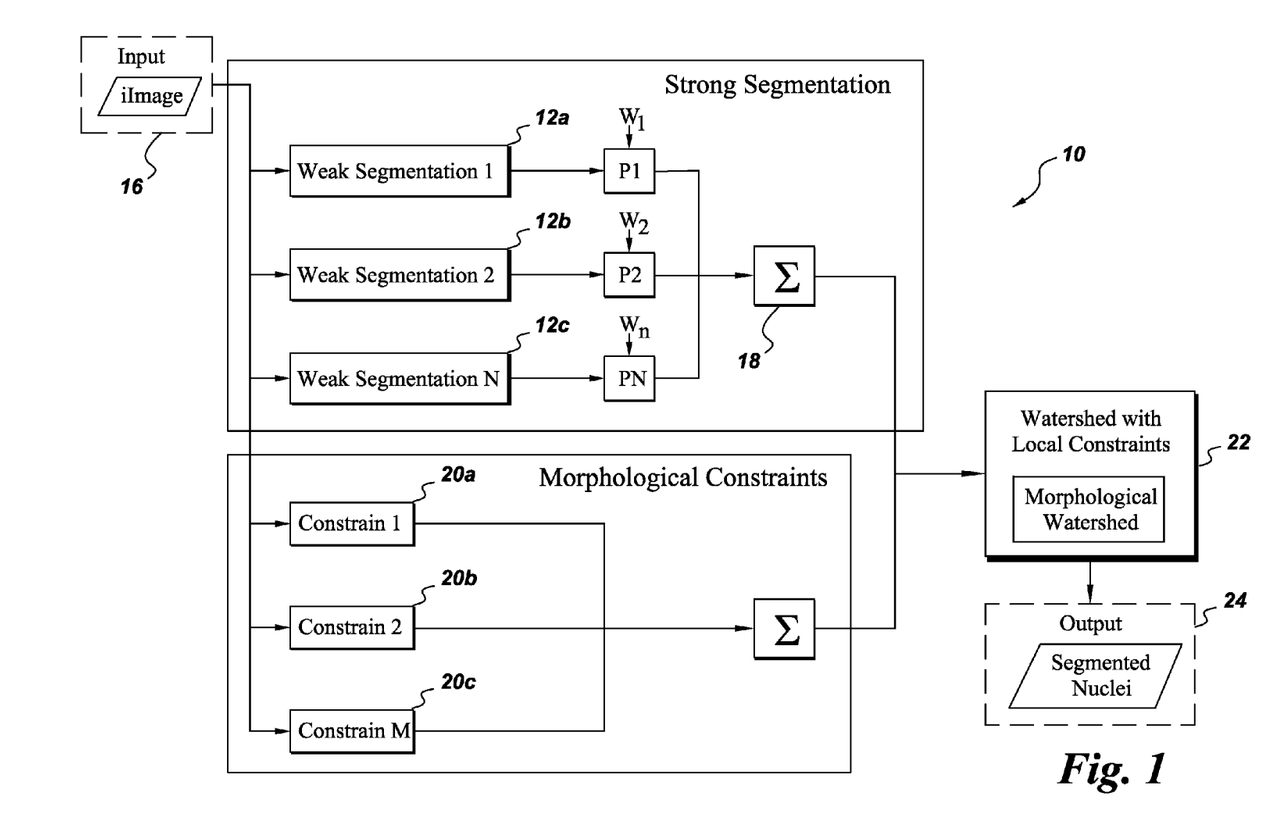
FIG. 1 is a flow diagram of an example of the method and system of the invention for segmenting an image.

An embodiment of the method of the invention, that is readily applicable to a variety of modalities and purposes, is generally shown and referred to in the flow diagram of FIG. 1 as method 10. In this embodiment, three segmentation classifiers 12A, 12B, and 12C are applied in step 14 to image 16. As an example, such classifier may comprise shape, intensity, and textural primitives. The resulting probability maps $P_1 \ldots P_N$ generated by the three weaker segmentation classifiers 12A-12N are used to generate a stronger segmentation classifier 18 that is based on a weighted combination of the weaker classifiers. The method is not limited to using a specific number of weaker classifiers (e.g. $S_1 \ldots S_N$) or a specific number of morphological constraints (e.g. $M_1 \ldots M_N$) and may be extended or enhanced with any suitable type and number of individual classifiers and constraints. Individual, weaker classifiers may include, but are not limited to, shape features (such as, regular and irregular elliptical, circular, semi-circular shapes), intensity features (such as, homogeneity, histogram based-methods), textural features, (such as fractals, wavelets, second or higher order statistics). Combination classifier 18, together with combined morphological constraints 20A, 20B and 20C, is then applied to image 16 using one or more regional thresholding algorithms, in step 22, together with one or more local constraints, to generate a resulting image 24, segmented at least in part into the target objects (e.g. cell nuclei).

Following is a non-limiting example used to illustrate various embodiments of the method and system.

Example

Figure 2:
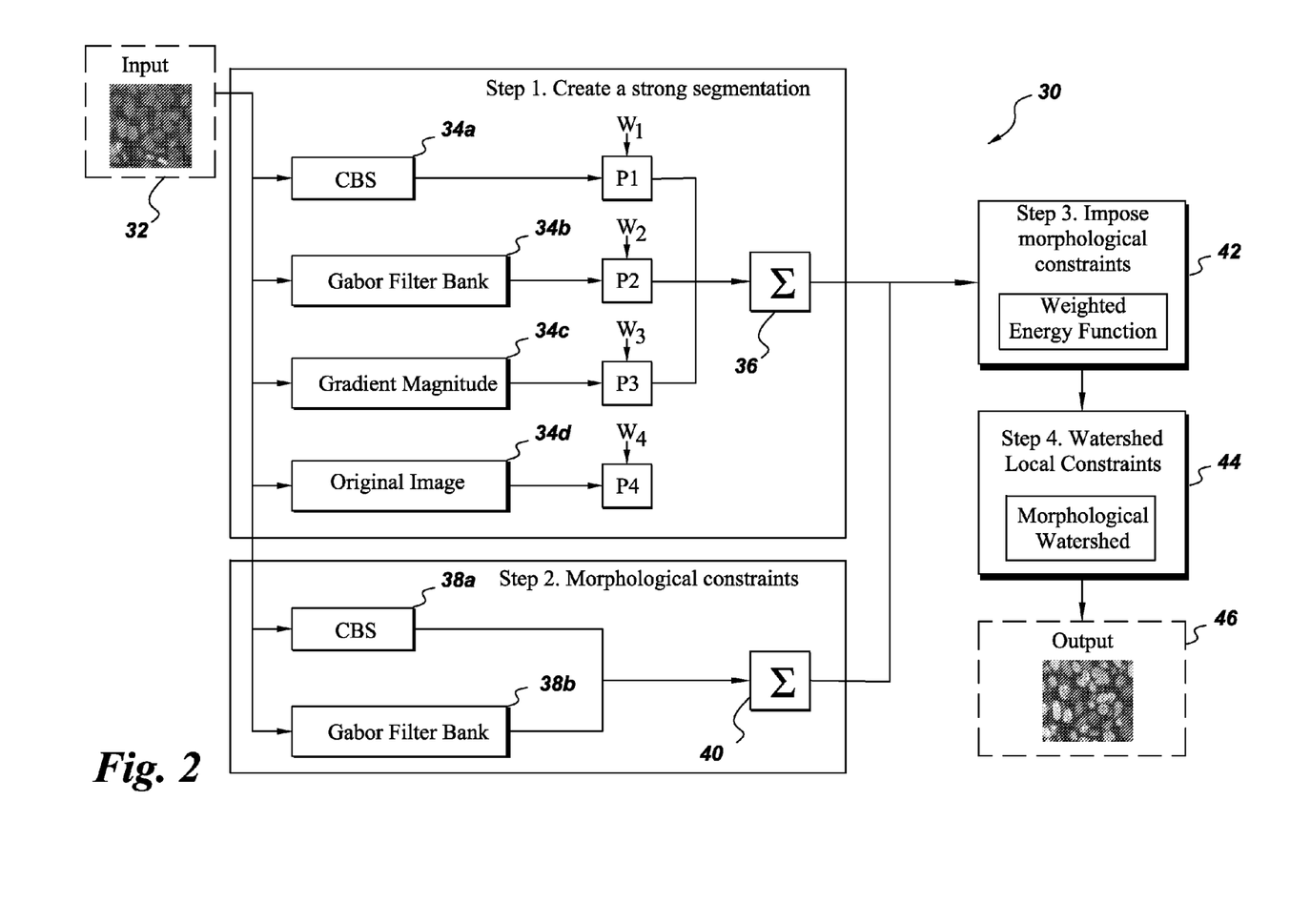
FIG. 2 is a flow diagram of a specific example of the method and system of the invention for segmenting an image.
Figure 4A:
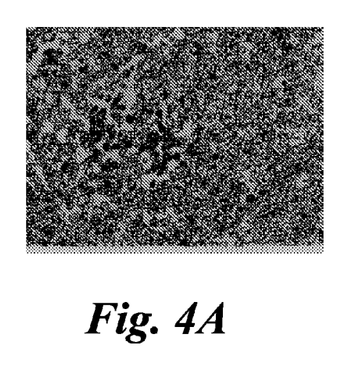
FIG. 4A is an example of a probability map generated using an example of a strong segmentation classifier.

Following is an example of the method of the invention, for segmenting an image 32, which is generally shown and referred to in FIG. 2 as method 30. This example is segmenting an image of a tissue sample into cells with identified cell nuclei. The example combines the results of four different weaker segmentations 34A-34D (classifiers) into a stronger segmentation 36 (combined classifier) (FIG. 4A). The first step comprises generating a strong segmentation classifier using a plurality of weaker segmentation algorithms. In this example, the strong classifier is generated using a curvature based segmentation algorithm, two different gradient based segmentation algorithms and an intensity based algorithm, which can be expressed as follows:

$$p_s = w_1 p_{CBS} + w_2 p_{Gabor} + w_3 p_{Gradient} + w_4 p_I, \; w_1 + w_2 + w_3 + w_4 = 1$$

Where $p_{CBS}$ represents the probability map that is computed using a curvature based segmentation algorithm, $p_{Gabor}$ represents the probability map that is computed using a Gabor filter based segmentation algorithm, $p_{Gradient}$ represents the probability map that is computed using a gradient segmentation and $p_I$ represents the probability map that is computed using an intensity based segmentation. The resulting probability map is a weighted average of the individual probability maps that are generated by the individual weak segmentation algorithms. The weights may be determined empirically or using supervised classification algorithms.

The method comprises generating a probability map for each of the four weaker segmentation algorithms. The probability map (FIG. 3A), in this example, that is generated using a curvature based segmentation algorithm 34A represented by $p_{CBS}$. To estimate the probability map, the eigenvalues $\lambda_1(x, y), \lambda_2(x, y)$, of a Hessian matrix, are numerically computed from:

$$\lambda_{12}(x, y) = \frac{1}{2} \left\{ \frac{\frac{\partial^2 I(x, y)}{\partial x^2} +}{\frac{\partial^2 I(x, y)}{\partial y^2} \mp \sqrt{\left(\frac{\partial^2 I(x, y)}{\partial x^2} - \frac{\partial^2 I(x, y)}{\partial y^2}\right)^2 + 4\frac{\partial^2 I(x, y)}{\partial x \partial y}}} \right\},$$

and the following two curvature features are estimated by:

$$\theta(x, y) = \tan^{-1}\left(\frac{\lambda_1(x, y)}{\lambda_2(x, y)}\right),$$

$$\phi(x, y) = \tan^{-1}\left(\frac{\sqrt{\lambda_1(x, y)^2 + \lambda_2(x, y)^2}}{I(x, y)}\right),$$

where $-\frac{3\pi}{4} \leq \theta(x, y) \leq \frac{\pi}{4}$, and $0 \leq \phi(x, y) \leq \frac{\pi}{2}$.

Figure 3A:
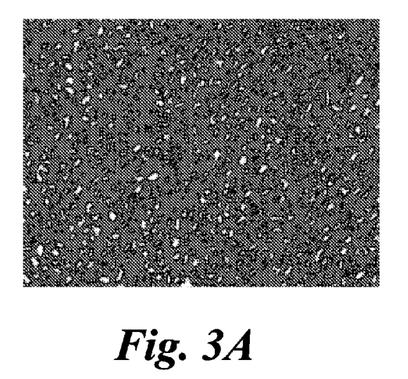
FIG. 3A was generated using a curvature-based classifier, FIG. 3B was generated using a Gabor filter bank, FIG. 3C was generated using a gradient classifier, and FIG. 3D was generated using an intensity classifier.

In this example, since the cell nuclei have a blob-like morphology which is bright, then the eigenvalues are negative and have an angle which is less than $\pi/2$. A probability map $p_{CBS}$ is estimated iteratively, where the probability that a pixel will belong in a blob-like structure is at a maximum when the pixel is at the center of the blob structure. Then a binary mask is estimated by selecting a threshold value, estimating the distance transform of the binary mask, where the response of the distance transform is at a maximum in the center of the blob-like structures and decreases outward toward the border or membrane of the cell or nucleus in this example.

Figure 3B:
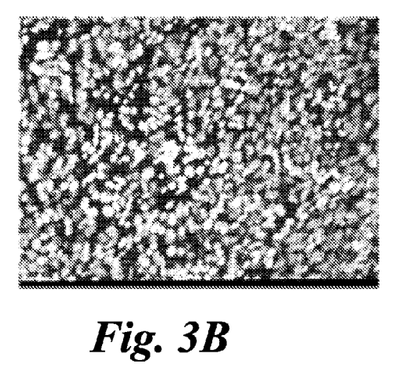

Next, geometrical information relating to the structure of cell nuclei is integrated (FIG. 3B) using, in this example, a Gabor filter bank 34B, which is a set of digital filters derived from multiplication of a Gaussian function and a harmonic function illustrated below:

$$g(x, y; \lambda, \theta, \psi, \sigma, \gamma) = e^{-\frac{x'^2 + \gamma^2 y'^2}{2\sigma^2}} \cos\left(2\pi \frac{x'}{\lambda} + \psi\right)$$

$$x' = x\cos\theta + y\sin\theta, \text{ and } y' = -x\sin\theta + y\cos\theta,$$

where $\lambda$ is the wavelength, $\theta$ is the orientation angle, $\psi$ is the offset, $\sigma$ is the width of the Gaussian kernel, and $\gamma$ is the spatial aspect ratio, which defines the ellipticity of the filter. The filter bank is constructed with three filters $G_L = \{G_1, G_2, G_3\}$, where each filter resembles an anisotropic Gaussian kernel at three different orientations: 0, 45 and 90 degrees, with an anisotropic Gaussian ratio of 4:1 and wavelength set to 1. The image captures geometrical information derived from the defined filter bank and is suitable to detecting elliptical structures at different orientations. The resulting image $I_{Gabor}$ is the maximum response of each filter and may be defined as:

$$I_{Gabor}(x, y) = \max(G_1 * I(x, y), G_2 * I(x, y), G_3 * I(x, y)),$$

where * denotes the convolution operator. The image $I_{Gabor}$ captures the geometrical information derived from the defined filter bank and is suitable for detecting elliptical structures, such as cells and cell nuclei, at different orientations. The response of the filter bank can be interpreted as the maximum likelihood of a given pixel to be nuclei. The response is maximum in the center, and close to zero near the borders. Then, a mapping function, $p_{Gabor}: R \rightarrow [0, 1]$, is defined from the response of the filter bank $I_{Gabor}$. The mapping function $p_{Gabor}$ is constructed so that it can be interpreted as a likelihood function that captures relevant morphological information from the given filter bank.

Figure 3C:
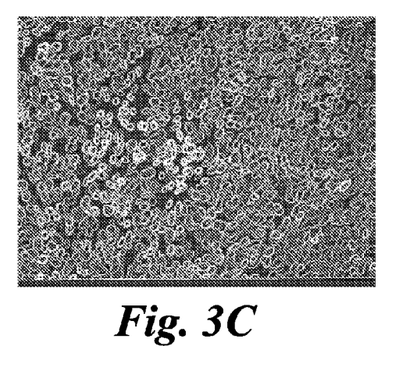
Figure 3D:
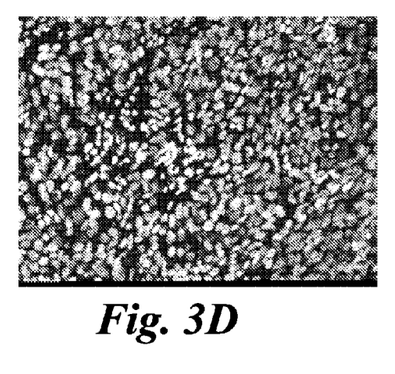

Images of DAPI channels in cell-based tissue comprise rich morphological nuclei information. Due to different sources of noise and variability, a simple thresholding of the DAPI image alone will not result in segmented nuclei regions. However, the morphological information a DAPI image provides can be used with other image transformations. In this example, the DAPI channel is used as a source of morphological information. The DAPI image is preprocessed by applying morphological operations to the image, such as erosion and dilation. Then a function 34D, $p_I: R \rightarrow [0, 1]$, is defined, which maps the intensity values to probabilities (FIG. 3D). To implement such function, a parametric sigmoid function is defined to map the image intensity values to probability values. The parametric sigmoid function may be defined as:

$$p_I(x) = \frac{1}{1 - e^{-(m_I x + b_I)}};$$

wherein the parameters $m_I$, $b_I$ are estimated from the image intensity values.

In this example, an estimate (FIG. 3C) is also generated based on a gradient segmentation algorithm 34C. The gradient segmentation is based on the magnitude of the gradient and has a maximum response at the border of the object, (e.g. in this example, the membrane of the nucleus) and a minimum response inside the object (e.g. nucleus). This is a penalty or distinguishing element that is used to separate the nuclei. The information of the gradient is complementary to the probability maps.

Figure 4B:
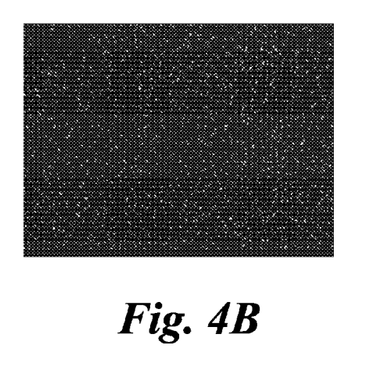
FIG. 4B is an example of a map showing the detected object centers.

In addition to generating the probability maps, seed points are also determined (FIG. 4B). The seed points $I_{Seeds}$ are located at the local maximum probabilities that are, in this example, normally at the center of the nuclei, and they are defined as $$I_{Seeds} = I_{CBS}^{Seed} \cup I_{Gabor}^{Seed}$$

where $I_{CBS}^{Seed}$ (38A) are the center points of the blob-like objects and $I_{Gabor}^{Seed}$ (38B) are nuclei center point derived from the Gabor filter bank. The $I_{CBS}^{Seed}$ comprise the centroid points of individual nuclei that are identified by those regions that have a local maxima, and they are defined as:

$$I_{CBS}^{Seed} = \bigcup_i \text{centroid}(c_i),$$

where $c_i$ is a single connected region which represents a nuclei cell. The single connected regions $c_i$ are estimated from the probability map $I_{CBS}$ by applying the watershed transform to the distance transform image, derived from binary volume $B_{CBS}$. $I_{Gabor}^{Seed}$ comprises the points that correspond to regional maxima corresponding to the response of the Gabor filter bank and they are defined as:

$$I_{Gabor}^{Seed} = \bigcup_i \text{regMax}(c_i)$$

where regMax is the local maxima operation.

Once the seed points are determined, morphological constraints 40 are derived from the seed points to ensure that the nuclei are effectively separated. FIG. 4B shows the detected nuclei center points $I_{Seeds}$. These are used as a set 42 to impose regions of local minimum in the watershed algorithm. The background is also excluded, so regions corresponding to local minima are imposed only in the foreground. The background is estimated from the combined stronger probability map generated from the individual weaker segmentations.

As shown in FIG. 2, given the determined seed points and the background mask, a watershed step 44 is then carried out by applying the morphological constraints to the weighted image (FIG. 4C), as illustrated below:

$$I_{Nuclei} = \text{watershed}(\text{Dist}(p_{s,\alpha}), I_{Seeds}),$$

where $p_{s,\alpha}$ is the binary image 46 (FIG. 4D) after applying a threshold value $\alpha$ from the probability image $p_s$.

Figure 4C:
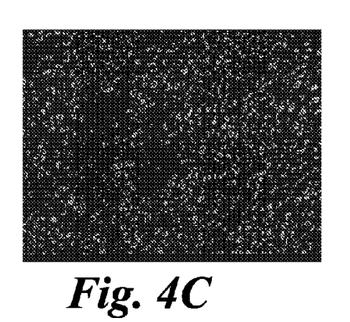
FIG. 4C is an example of a weighted image using morphological constraints.
Figure 4D:
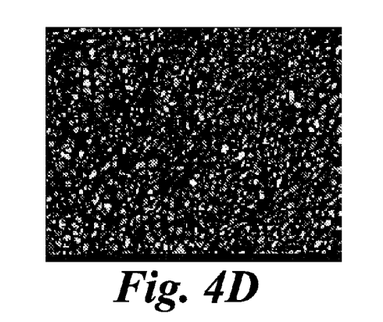
FIG. 4D is an example of a segmented image.
Figure 4E:
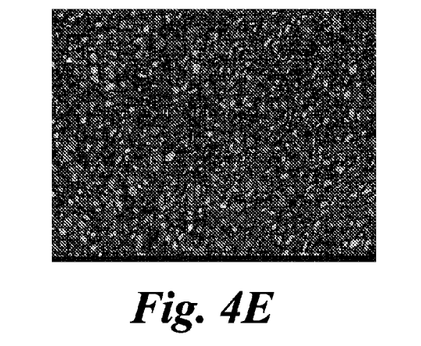
FIG. 4E is an example of a final segmented image merged with the mapped nuclei.
Figure 5A:
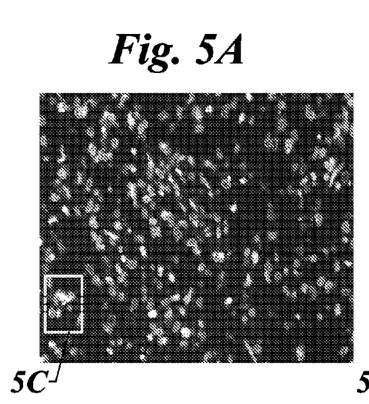
FIG. 5A is an example of an original, unsegmented image with a portion outlined in a red square.
Figure 5B:
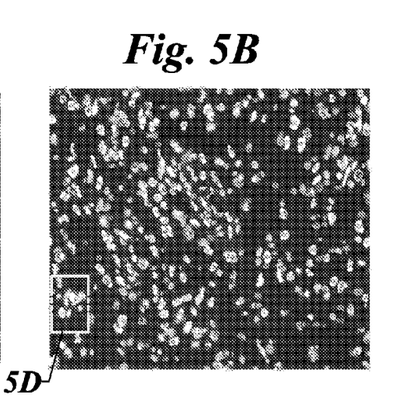
FIG. 5B is an example of a final segmented image generated using an example of a method of the invention with the same corresponding portion outlined in a red.
Figure 5C:
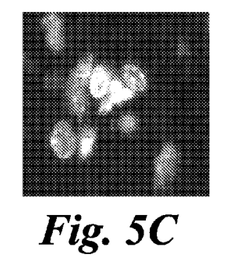
FIG. 5C is a magnified view of the outlined portion of FIG. 5A.
Figure 5D:
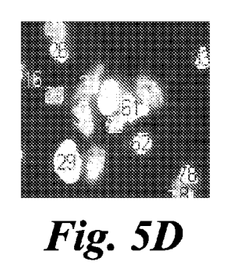
FIG. 5D is a magnified view of the corresponding outlined portion of FIG. 5B.
Figure 6A:
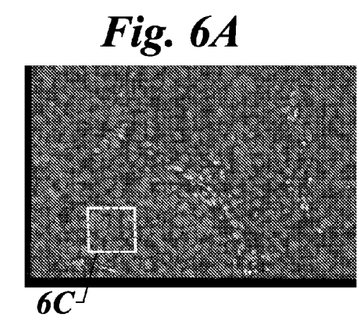
FIG. 6A is another example of an original, unsegmented image of a xenograft model with a portion outlined in a red square.
Figure 6B:
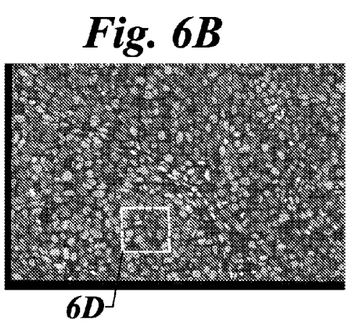
FIG. 6B is an example of a final segmented image generated using an example of a method of the invention with the same corresponding portion outlined in a red.
Figure 6C:
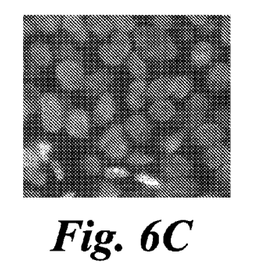
FIG. 6C is a magnified view of the outlined portion of FIG. 5A.
Figure 6D:
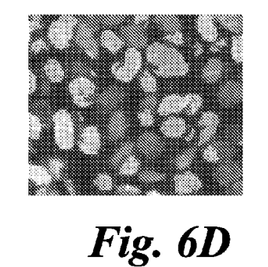
FIG. 6D is a magnified view of the corresponding outlined portion of FIG. 5B.

FIG. 4C is the local constraints image, notice that the nuclei center is black since it corresponds to a local minimum, and the cell borders are brighter since they correspond to local maximum. FIG. 4D presents the detected nuclei regions, and FIG. 4E presents the final segmentation after merging those regions that correspond to the same nuclei Example The method, when applied to a xenograft model, provides similar results as shown in FIGS. 5A-5D. FIG. 5A-5D show a DAPI image corresponding to the xenograft model. FIGS. 5A and 5B are the original and the segmented image, respectively. FIGS. 6C and 6D show of the original image and the segmentation, respectively. The variations in shape, size, and appearance shown are due to non uniformity of the fluorescent dye. The segmentation results from the method are highly accurate and consistent, even in images where the cell nuclei are crowded, overlapping and frequently touching. As shown in FIG. 6, cells 50, 36, and 37 are clear distinguishable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for segmenting a digital image into a plurality of target objects, comprising,
   generating a plurality of probability maps of the image, wherein each probability map is derived from a different segmentation classifier;
   generating a combined probability map based on the plurality of probability maps;
   mapping a plurality of image points based on one or more local object maxima;
   applying one or more object constraints based at least in part on the mapped points to identify local object information;
   applying one or more regional thresholds to the combined probability map, given the local object information and a background mask, to segment the image into regions;
   creating a segmented image at least in part by merging the segmented regions with corresponding local object maxima; and
   at least temporarily storing or displaying the segmented image on a digital device.

2. The method of claim 1, wherein at least one of the object constraints is a morphological constraint.

3. The method of claim 2, wherein the morphological constraint is based on a cell nucleus.

4. The method of claim 1, wherein the target objects are biological cells.

5. The method of claim 1, wherein segmentation classifiers are selected from a group consisting of size, shape, intensity, texture, wavelets and fractals.

6. The method of claim 1, wherein the combined probability map is based on a weighted average of the plurality of probability maps.

7. The method of claim 6, wherein the weighted average is defined empirically.

8. The method of claim 6, wherein the weighted average is predefined.

9. The method of claim 1, wherein at least one of the segmentation classifiers is based on object curvature.

10. The method of claim 9, wherein at least one of the segmentation classifiers is a set of digital filters derived at least in part from a Gaussian function and an harmonic function.

11. The method of claim 9, wherein one or more of the segmentation classifiers is based on gradient, intensity, wavelets or fractals.

* * * * *